April 6, 1965   A. HAKIMOGLU ETAL   3,177,375
TIME-OF-OCCURRENCE MARKERS
Filed March 27, 1961   2 Sheets-Sheet 1

Ayhan Hakimoglu
Richard D. Kulvin
Joseph L. Nelson
INVENTORS

BY Michael P. Breston

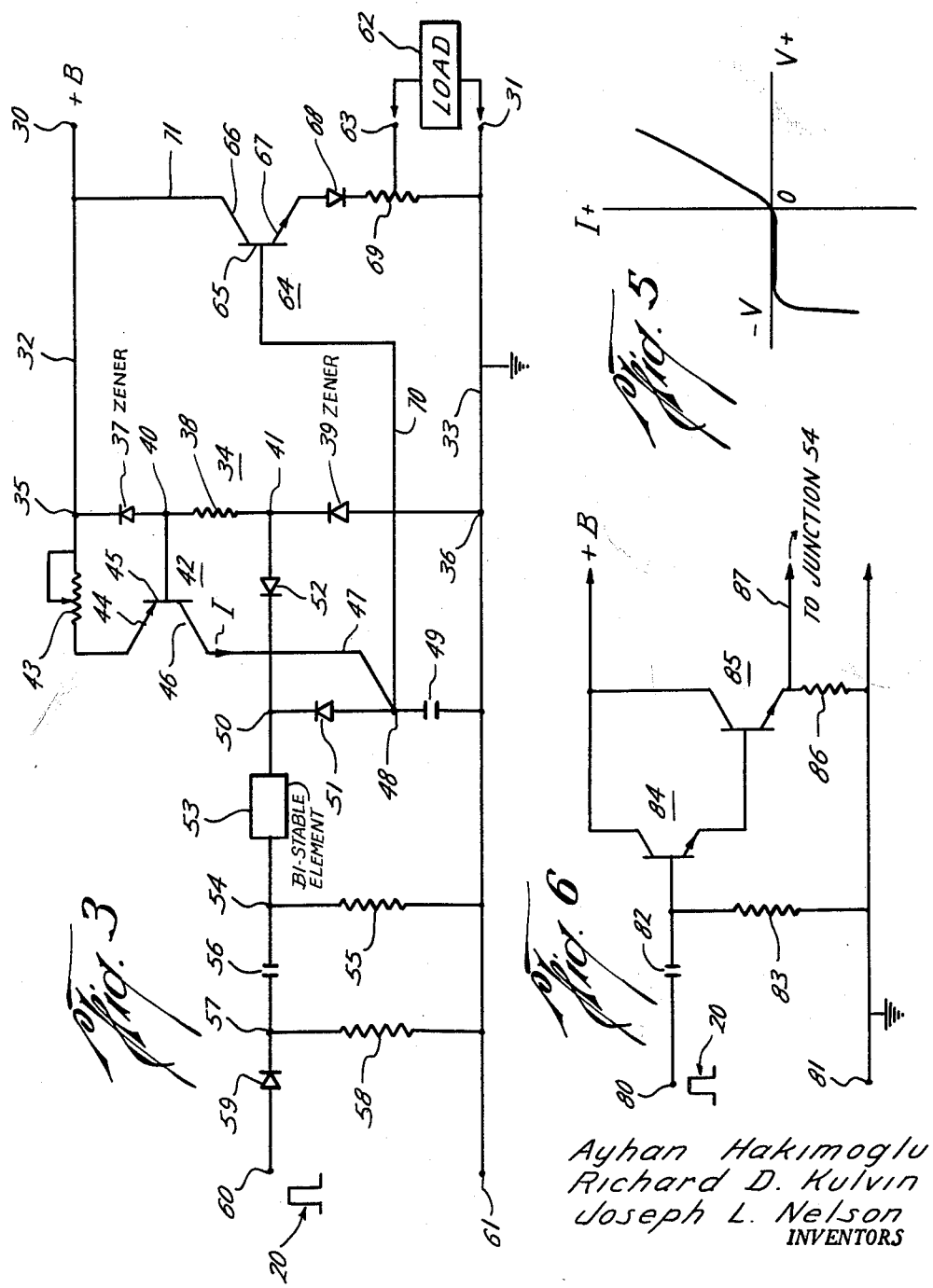

United States Patent Office 3,177,375
Patented Apr. 6, 1965

3,177,375
TIME-OF-OCCURRENCE MARKERS
Ayhan Hakimoglu, Levittown, N.J., Richard D. Kulvin, Levittown, Pa., and Joseph L. Nelson, Highland Park, N.J., assignors to Electro-Mechanical Research, Inc., Sarasota, Fla., a corporation of Connecticut
Filed Mar. 27, 1961, Ser. No. 98,528
2 Claims. (Cl. 307—88.5)

This invention relates generally to telemetering systems and more particularly to time-of-occurrence markers for accurately determining the time of occurrence of an event.

Most of the intelligence data originating in missiles, rockets, and other modern space vehicles is of relatively low frequency content. A small portion of the intelligence spectrum, however, includes very fast rising signals, the steepness of which may be indicative of the initiation of a critical event. For example, resonant vibrations in a rapidly accelerating aircrafth often lead to an eventual failure of a structural member subjected to the stresses and strains of these vibrations. Often, a timely detection of such vibrations may avert a disaster. Usually, the first critical event sets up a chain of damaging events. Considering the high cost of duplicating missile tests, the importance of determining the time of occurrence of the first critical event becomes evident.

If the frequency band assigned to a telemetering system were not limited, the time of occurrence of all events could be relatively easily monitored. In fact, the available bandwidth is limited. It must therefore be judiciously distributed among all the channels of the telemetering system. If the width of the band assigned to each channel were determined on the basis of the highest frequency which the channel is expected to carry, the critical event-carrying channels would occupy most of the available bandwidth because the steep signals representative of critical events contain relatively high-frequency signals, whereas most of the intelligence spectrum is composed of relatively low-frequency signals. Hence, a band distribution on such a basis would be very inefficient.

This inefficiency may be remedied by employing an event marker as a means for translating the high-frequency components of the steep signals into very low-frequency signals which may then be transmitted over narrow-band channels.

An illustrative operation of a telemetering system employing an event marker is as follows: a pulse generator sends out a trigger pulse whenever it receives a signal, representative of an event, above a threshold value; the trigger pulse is then applied to an event marker to provide a voltage ramp which increases linearly as a function of time during a predetermined time interval; a sufficient number of points on the ramp are sampled by a commutator for transmission to a receiving station; the sampled points are typically plotted on a chart, and by drawing a line through them, the time of occurrence of the event which originated the ramp may be accurately ascertained; the abscissa of the point of intersection, between the line drawn through the samples and the line representing the quiescent output voltage of the event marker, is the time of occurrence of the event.

Essentially, such an event marker is based upon an extrapolation method. The accuracy of a telemetering system employing an event marker to ascertain the time of occurrence of an event depends, primarily, upon the ability of the event marker to produce a linear voltage ramp during a relatively long time interval.

Accordingly, it is an object of this invention to provide a new and improved event marker for determining the time of occurrence of events which is capable of producing linear voltage ramps over relatively long time intervals.

Another object of this invention is to provide a new and improved event marker which is extremely stable under severe environmental conditions, which employs a minimum of components, which requires little energizing power, which can be economically assembled, and which may be packaged in a very small volume for airborne use.

Briefly, these and other objects of this invention are accomplished by supplying a constant direct current to a large capacitor; a bi-stable impedance control device, of low internal impedance when the current passing therethrough is above a critical maintaining value and of high internal impedance when the passing current falls below the maintaining value, is connected in a parallel branch network across the captcitor; the control device determines both the time of initiation and of termination of the voltage ramp appearing across the capacitor. In the absence of an event, the entire constant current is fed through the control device which is in its low impedance, or ON state; the occurrence of an event, which results in an applied trigger pulse to the input terminals of the event marker, causes a substantial reduction in the current flow through the control device thereby switching it to its high impedance, or OFF state; thereupon, the constant current starts charging the capacitor to linearly raise its potential as a function of time and upon reaching the critical voltage, corresponding to the critical current, the control device is turned on to provide an "easy" flow path for the constant current and the stored energy in the capacitor; thereafter, the capacitor discharges substantially instantaneously to a fixed quiescent voltage level until the occurrence of the next event.

The above and still further objects, features, and advantages of the new and improved event marker of the present invention will become apparent upon consideration of the following detailed description, especially when taken in conjunction with the accompanying drawings, wherein:

FIG. 3 is a schematic circuit diagram of a preferred embodiment of the event marker in accordance with the present invention;

FIG. 5 is a typical curve of a voltage-regulating element employed by the constant current source of FIG. 3; and FIG. 6 is a modification of the input circuit of FIG. 3.

Figure 1:
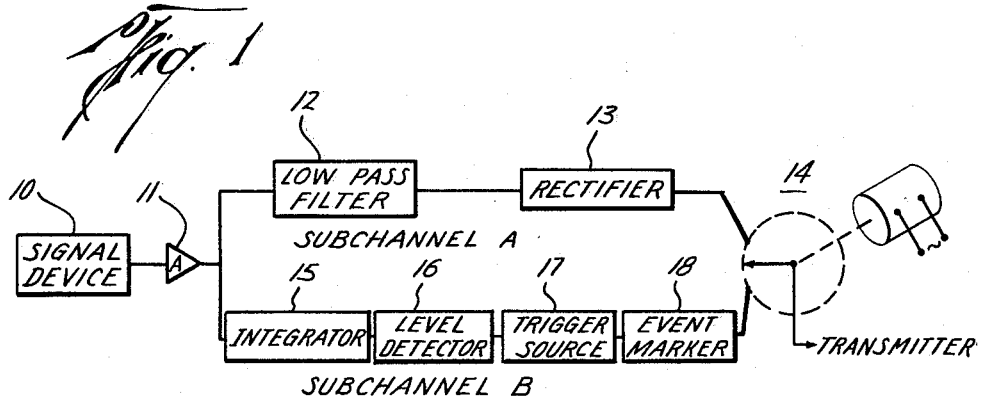
FIG. 1 is a block diagram of a typical telemetering system employing the event marker of the present invention.

As shown in FIG. 1, a typical application of the event marker of the present invention is in a telemetering system for determining the amplitude variations in the output voltage or current of a signal source 10, such as an accelerometer transducer, a strain gauge bridge, a thermocouple, etc. Signal source 10 translates physical environmental conditions into electric intelligence signals; variations in the intensity of the monitored conditions cause corresponding variations in the amplitudes of the output intelligence signals which are typically amplified by amplifier 11.

The lower end of the output intelligence spectrum of source 10 represents events which change gradually with time, whereas the upper end represents events which change abruptly. In order to telemeter the entire spectrum through narrow-band channels, the output of amplifier 11 is conveniently applied to two parallel subchannels A and B. The low-frequency signals in the lower portion of the intelligence spectrum will pass through the low-pass filter 12 of sub-channel A. After being rectified by rectifier 13, they are typically applied to one terminal of multi-terminal commutator 14. Although electronic or magnetic commutators are usually employed, commutator 14 is represented, for the sake of simplicity, as a mechanically driven switch.

The high-frequency signals of the upper portion of the intelligence spectrum, being above the cut-off frequency of low-pass filter 12, are processed through sub-channel B. To eliminate the effects of spurious transient spikes which are devoid of information content, the signals are first integrated by integrator 15. Therefore, only high-energy signals will produce at the output of integrator 15 a substantial variation in the average voltage level, which, when exceeding a fixed threshold level, is detected by a voltage level detector 16. This detector provides an output signal which actuates a trigger source 17, such as a one-shot multivibrator. The trigger source 17 is coupled to the event marker 18 whose output is applied to another terminal of commutator 14.

Figure 2A:
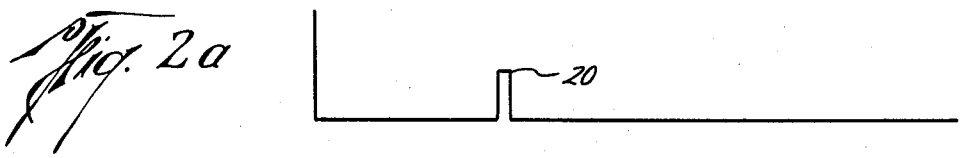
FIGS. 2a–2c are curves serving to explain the operation of the system of FIG. 1.
Figure 2B:
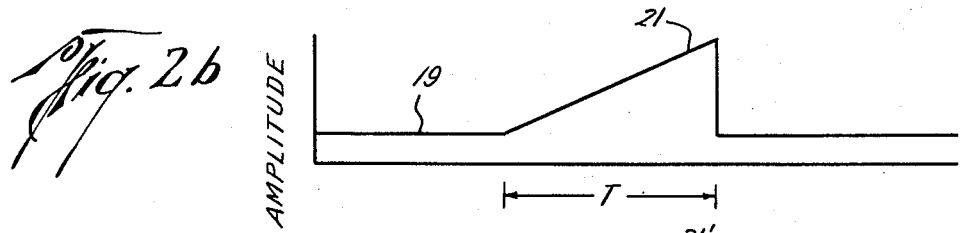
Figure 2C:
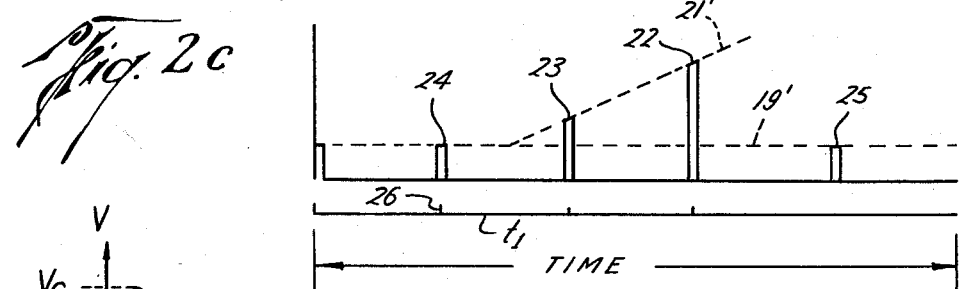

Referring to FIGS. 2a through 2c, when a sudden event occurs at time $t_1$, a trigger pulse 20 from source 17 is applied to the input terminals of event marker 18 to provide at its output a substantially linear voltage ramp 21 starting from a fixed quiescent voltage level 19. After a time interval T, the ramp will cease at time $t_2$ to return to its quiescent level 19. The output voltages of the event marker 18 and of the rectifier 13 are periodically sampled by commutator 14 to produce a time-multiplexed train of pulses whose respective amplitudes represent the intelligence signals existing in the respective channels of the telemetering system. The multiplexed wave typically frequency modulates the carrier frequency of a transmitter oscillator (not shown) for transmission through a radio link to a remote receiving station. At the receiving station, the frequency-modulated carrier is demodulated to obtain the time-multiplexed train of pulses which is then decommutated into its constituent channel pulses.

The sampling rate of commutator 14 is such that at least two segments 22 and 23 of the ramp 21 are sampled. Given the location of small segments 22 and 23 on a chart of a recorder, a line 21' (shown dotted) can be drawn therethrough. Similarly, a line 19' is drawn through at least two samples 24 and 25 of the quiescent voltage level 19. The time $t_1$ of the occurrence of the event is determined, as shown in FIG. 2c, by the intersection between lines 19' and 21'. The known markers of the time scale are provided by clock pulses 26 which are synchronized with the speed of commutator 14. In sum, the significant data of the complex intelligence spectrum of signal source 10 has been telemetered by the foregoing system through two narrow-band sub-channels A and B.

A preferred embodiment of an event marker capable of producing long ramps is shown in FIG. 3. A B+ voltage supply is connected to terminals 30, 31; terminal 31 may be grounded. Conductors 32, 33 connect terminals 30, 31 to junctions 35, 36, respectively. A series-circuit voltage divider 34 is connected between junctions 35 and 36. It comprises two voltage-regulating elements 37, 39 and a resistor 38 connected therebetween.

Elements 37, 39 maintain fixed potentials at junctions 40 and 41. When the voltage drop across each element reaches a characteristic value $V_s$, it will, thereafter, remain constant over a wide range of current values. Each element is selected with a characteristic value $V_s$, depending upon the desired voltages at junctions 40, 41. Preferably, elements 37, 39 are reverse biased Zener diodes, a typical characteristic curve of which is shown in FIG. 5. $V_s$ is a negative voltage; consequently, diodes 37 and 39 are connected to have a positive voltage drop from cathode to anode.

If the B+ supply is fixed, the potentials at junctions 40 and 41 will also be fixed. If the B+ supply should change in value by an amount $\Delta V$, this entire amount $\Delta V$ will appear across resistor 38 and, again, the potentials of junctions 40 and 41 will be fixed. In parallel with diode 37 is a variable resistor 43 connected to the emitter 44 of a PNP transistor 42 whose base 45 is connected to junction 40. For any setting of the tap on resistor 43, the emitter-base junction will be forward biased by a fixed voltage and, therefore, a constant current I will flow from collector 46 into conductor 47, leading to junction 48. Between junctions 48 and 36 is connected a large capacitor 49. Junctions 48 and 50 are interconnected by a voltage-level-detecting element 51 to conduct current whenever the potential of junction 48 exceeds the potential of junction 50. Element 52, connected between junctions 41 and 50, serves the function of maintaining the potential of junction 50 substantially at or above the fixed potential of junction 41. Elements 51 and 52 are preferably asymmetrically conducting, conventional crystal diodes which conduct current whenever their anodes are positive. Diode 51 is poled to conduct current in its easy flow direction from junction 48 to junction 50; diode 52 is poled to conduct current in its easy flow direction from junction 41 to junction 50. Between junctions 50 and 54 is provided a current "dump" circuit comprising a bi-stable impedance device 53 and a low-valued, current-flow-limiting resistor 55 both connected in series.

Figure 4:
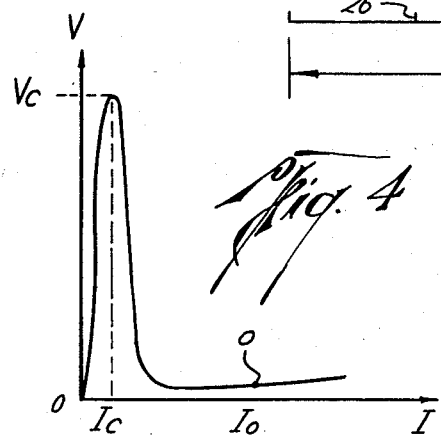
FIG. 4 is a representative voltage-versus-current characteristic curve of the bi-stable control device of FIG. 3.

A characteristic voltage-versus-current curve of bistable impedance device 53 is shown in FIG. 4. When the voltage drop across it is increased from zero to a value below a critical voltage $V_c$, its internal resistance is stable (OFF state) and is very high, say, 10 to 1,000 megohms; as soon as this voltage drop slightly exceeds $V_c$, its impedance becomes negative during a short time interval and, thereafter, it becomes again stable at a very low positive resistance (ON state), say, 10 ohms or less. Thereafter, the voltage drop across device 53 remains substantially constant with wide changes in current. When the current through device 53 is reduced from an operating value $I_o$ below the maintaining current $I_c$, corresponding to the critical voltage $V_c$, the device switches back to its high impedance or OFF state. Consequently, the impedance level of device 53 can be controlled by controlling the amount of current flowing through it. Device 53 can be selected with any desired critical voltage $V_c$. Several known components may be employed to perform the function of device 53, such as unijunction transistors, four-layer Shockley diodes, etc. Excellent results were obtained, in a model embodying the circuit of FIG. 3, with Shockley diodes and, for convenience, device 53 will hereinafter be referred to as a Shockley diode.

To confine the D.C. current flowing in device 53 to current-limiting resistor 55, a blocking capacitor 56 is provided between junctions 54 and 57. Junction 57 is connected to junction 36 through a high-valued resistor 58. To make the event marker responsive only to positive pulses, a conventional diode 59 is connected between input terminal 60 and junction 57. Diode 59 is poled to conduct current in the easy flow direction from terminal 60 to junction 57. The other input terminal 61 is connected to ground.

In order to prevent the utilization device 62, connected to output terminal 63, from draining a portion of the constant current I supplied to capacitor 49 and thereby affect the ramp linearity, preferably a single NPN transistor 64 is connected as a high-input impedance, low-output impedance emitter-follower buffer stage. Its base 65 is connected to junction 48 via conductor 70; its collector 66 is connected to terminal 30 via conductor 71; and, its emitter 67 is connected to ground through a load network comprising a diode 68 connected in series with a voltage divider 69. The function of diode 68 is to maintain a linear relation over a wide dynamic range, between the current flowing in lead 70 and the emitter current.

In an exemplary operation of the event marker of FIG. 3, the applied B+ voltage supply is divided between Zener diodes 37, 39 and resistor 38. For a suitable value of the voltage supply, sufficient to break down Zener diodes 37 and 39, the potentials at junctions 40 and 41 will be fixed by the respective characteristic diode voltage values, $V_s$. For a particular setting of variable resistor 43, a constant current will flow into the base-emitter junction of transistor 42 to provide a constant output collector current I. The amplitude of I will remain constant over wide changes in emitter-collector voltage drop resulting from variations in the potential of junction 48. Because of the polarity of diodes 51 and 52, junction 50 cannot drop below the potential of either junction 48 or of junction 41 by more than the forward diode voltage drop, which will be hereinafter assumed to be negligible. Inversely, and for the same reason, junction 50 can rise above the potential of either junction 41 or of junction 48.

Assuming capacitor 49 to be initially completely discharged, then diode 51 will be reverse biased. Since the respective impedances of diode 51 and of the base-emitter junction of transistor 64 are very high, almost the entire current I can flow only into capacitor 49. The voltage of junction 48 will therefore start linearly rising with time and its instantaneous value may be determined from the linear relationship given by $V=I/Ct$: where C is the capacitance of 49 in farads, I is in amperes, and $t$ is in seconds. It will be appreciated that by increasing the amplitude of the charging current I, junction 48 will reach a predetermined voltage level in a correspondingly shorter time interval. This can readily be accomplished by changing the setting on resistor 43.

Thus, the potential of junction 48 will rise linearly with time at a slope determined by $I/C$. After a certain time interval, determined by the potential of junction 41, junction 48 will reach the potential of junction 50. As capacitor 49 continues to charge, dode 51 will become forward biased and diode 52 reverse biased; junction 50 will continue to follow the potential of junction 48 until the critical voltage $V_c$ of the bi-stable Shockley diode 53 is reached. At the instant that the potential of junction 50 exceeds $V_c$, device 53 will start heavily conducting and assume its stable low-impedance state.

The entire output current I, the current flowing from junction 41, and the discharge current of capacitor 49 will now begin to flow through the dump-circuit-comprising device 53 and low-valued resistor 55. Capacitor 49 will continue to discharge until junction 48 exceeds the potential of junction 50 only by the forward-bias voltage drop across diode 51. If diodes 51 and 52 have matched characteristics, capacitor 49 will discharge until the potentials of junctions 41 and 48 are substantially equal. Thereafter, as long as current I exceeds the maintaining current $I_c$, Shockley diode 53 will continue to conduct and the potential of junction 48 will be held fixed by Zener diode 39.

Upon the happening of an event, trigger source 17, when actuated by an output signal from level detector 16, provides a positive pulse 20 to input terminals 60, 61. Diode 59 and blocking capactor 56 present a relatively low-impedance path to pulse 20 which tends to cause a current flow in device 53 in a direction opposite to the flow of current I. This has the effect of reducing the net current flow from junction 50 to junction 54 below the maintaining current $I_c$, thereby causing Shockley diode 53 to switch to its high impedance, or OFF state. Thereafter, current I will again start charging capacitor 49, as previously described, until the potential of junction 48, and hence of junction 50, again exceeds the critical voltage $V_c$ of diode 53.

In sum, the happening of an event initiates a linear voltage ramp across capacitor 49 for a time interval determined by the amplitude of the charging current I and the critical voltage $V_c$ of bi-stable impedance device 53. If current I is constant, the ramp duration will be only a function of $V_c$. Because the "dump" circuit can rapidly carry away all the supplied current, the ramp drops substantially instantaneously to its quiescent voltage level which is held constant by Zener diode 39, irrespective of wide variations in the current flow through the voltage divider circuit 34.

It should be noted that the net current flow through device 53 could also be reduced by applying a negative pulse to junction 50, instead of applying a positive pulse to junction 54. However, since the application of a large negative pulse to junction 50 might tend to affect the linearity of the output ramp, it is preferred to employ positive triggering pulses.

The ramp appearing at junction 48 is applied to the emitter-follower buffer stage: the potential of emitter 67 will be equal to the potential of junction 48 less the negligible voltage drop across the base-emitter junction, typically, 0.5 volt; the input imepdance to the base-emitter circuit will be very high. A portion of the output signal appearing at the emitter 67 will be provided by voltage divider 69 to utilization device 62 connected to output terminal 63.

Referring again to FIGS. 2a–2c, the ramp is initiated at time $t_1$ in response to positive pulse 20; at time $t_2$, the ramp will terminate when its maximum amplitude reaches a potential substantially equal to the critical voltage $V_c$ of device 53. Since $V_c$ is usually predetermined, keeping the quiescent voltage level 19 of output terminal 63 near ground allows the achievement of a longer ramp duration T. For a given sampling rate of commutator 14, a longer ramp will in turn provide more samples and, therefore, improve the accuracy with which the event marker can determine the time of occurrence of an event.

Since the impedance looking into terminal 63 of the emitter-follower stage is very low, the output ramp will appear as if generated by a low internal impedance voltage source. This assures that the linearity of the ramp 21 will not be substantially affected by variations in the output load.

Referring now to the input circuit of the event marker, since the potential of junction 50 is fixed and, further, since the current flowing through diode 53 is substantially constant, the amount of current which the trigger source 17 must supply to turn off device 53 will depend upon the potential of junction 41 and upon the value of resistor 55 which determines the quiescent operating current $I_0$ in FIG. 4. This amount then is equal to $(I_0-I_c)$. If the triggering source 17 has stringent output current limitations, then one or more emitter-follower stages may be provided to substantially reduce this current drain.

A modification of the input circuit of FIG. 3, to serve as a substitution for diode 59, resistor 58 and capacitor 56, is shown in FIG. 6. Two emitter-follower stages are provided for isolating the trigger source 17 from Shockley diode 53. The incoming pulse 20 from source 17 is applied to terminals 80 and 81, the latter being grounded. After passing through a blocking condenser 82, this pulse appears across high-valued resistor 83. Two NPN transistors 84, 85 have their collectors connected to the B+ voltage supply. The emitter of transistor 84 is connected to the base of transistor 85. The operation of each emitter follower stage is conventional; pulse 20 across resistor 83 is applied to the base of transistor 84 and will appear at the emitter of transistor 85 to be applied directly to junction 54 via conductor 87. Since the input impedance to the base-emitter circuit of transistor 84 is very high, the current drain on trigger source 17 is at a minimum; also, the emitter circuit of transistor 84 can provide a large substantially instantaneous current, sufficient to reduce the operating current $I_0$ through Shockley diode 53 below the maintaining current $I_c$.

The choice of the circuit elements employed in the embodiments illustrated in FIGS. 3 and 6 is subject to wide variations. Merely to exemplify the practice of the invention and not in restriction of its scope, the following set of values is given:

| | |
|---|---|
| Transistor 42 | 2N 327 |
| Transistor 64 | 2N 543 |
| Transistors 84, 85 | 2N 332 |
| Diode 37 | 1N 751 |
| Diode 39 | 1N 748 |
| Diodes 51, 52, 59, 68 | 1N 482 |
| Capacitor 49 | microfarads 22 |
| Capacitor 56 | do .3 |
| Resistor 43 | 1.7K |
| Resistor 38 | 1.5K |
| Resistor 55 | ohms 200 |
| Resistor 58 | 56K |
| Resistor 69 | 16K |
| The resistance between terminals 63, 31 | 5K |
| Capacitor 82 | microfarads .01 |
| Resistor 83 | 100K |
| Resistor 86 | ohms 200 |
| Shockley diode 53 | 4N 30D |
| $I_c$ of Shockley diode 53 | milliamps 3±2 |
| $V_c$ of Shockley diode 53 | volts 18±2 |
| The B+ voltage supply | do 28±2 |

With the foregoing parameters, the quiescent level 19 was .8 volt maximum, the voltage at the end of the ramp was 6.5 volts; the linearity of the ramp remained better than 0.25%, and the duration of the ramp was approximately .11 second.

While there has been above described but a limited number of embodiments of the invention, many changes and modifications may be made therein without departing from the spirit of the invention and it is not desired, therefore, to limit the scope of the invention except as pointed out in the appended claims.

What is claimed is:

1. An event marker comprising in combination: a capacitor having a first and a second terminal for producing a voltage ramp thereacross in response to a trigger pulse indicative of the occurrence of an event, a substantially constant current generator coupled to said capacitor for charging said capacitor, a first and a second semiconductor diodes, a reference direct current voltage source; means connecting said source, said first, and said second semiconductor diodes across said capacitor to maintain a fixed potential thereon before the occurrence of an event; a bi-stable impedance device having a high-impedance state when the potential on said capacitor is below a predetermined level and a low-impedance state when said potential is above said predetermined level; means coupling said device between the junction of said first and second diodes and said second terminal for carrying the output current of said current generator and of said reference source; and means coupling said trigger pulse to said device for switching said device from said low- to said high-impedance state thereby marking the origin of said ramp which rises to an amplitude dependent on said predetermined level.

2. An event marker comprising in combination: a capacitor for providing a voltage ramp thereacross in response to a trigger pulse indicative of the occurrence of an event, a first semiconductor diode, a second semiconductor diode, a reference direct current voltage source, means connecting said first diode and said reference source in series to form a first branch network, means connecting said second semiconductor diode in series with said capacitor to form a second branch network, means connecting said first and said second branch networks in parallel; said first diode being poled to oppose the flow of current from said capacitor to said reference voltage source and said second diode being poled to oppose the flow of current from said reference voltage source into said capacitor; a bi-stable impedance device having a high-impedance state when the potential on said capacitor is below a predetermined level and a low-impedance state when said potential is above said predetermined level; a resistive element, means connecting said device and said element in parallel with said second branch network, means coupling said trigger pulse to said device for switching said device from said low- to said high-impedance state thereby marking the origin of said ramp which rises to a height as established by said predetermined level, and output means coupled to said capacitor for providing said ramp, said output means having a high input impedance and a low output impedance.

References Cited by the Examiner

UNITED STATES PATENTS

| | | | |
|---|---|---|---|
| 2,716,729 | 8/55 | Shockley | 307—88.5 |
| 2,719,226 | 9/55 | Gordon et al. | 328—63 |
| 2,855,524 | 10/58 | Shockley | 307—88.5 |
| 2,892,952 | 6/59 | McVey | 307—88.5 |
| 2,931,857 | 4/60 | Hammond et al. | 328—189 |
| 2,957,090 | 10/60 | Hamilton | 307—88.5 |
| 2,997,665 | 8/61 | Sylvan | 307—88.5 |
| 3,018,384 | 1/62 | Zrubek | 307—88.5 |
| 3,048,710 | 8/62 | Shockley | 307—88.5 |
| 3,091,738 | 5/63 | Relis et al. | 328—114 |

ARTHUR GAUSS, *Primary Examiner.*

HERMAN K. SAALBACH, GEORGE N. WESTBY, *Examiners.*